United States Patent [19]

Teitler et al.

[11] Patent Number: 5,722,086
[45] Date of Patent: Feb. 24, 1998

[54] METHOD AND APPARATUS FOR REDUCING POWER CONSUMPTION IN A COMMUNICATIONS SYSTEM

[75] Inventors: Nicole D. Teitler, Austin, Tex.; Luis Bonet, Boynton Beach, Fla.

[73] Assignee: Motorola, Inc., Schaumburg, Ill.

[21] Appl. No.: 603,109

[22] Filed: Feb. 20, 1996

[51] Int. Cl.⁶ .................. H04B 1/38; H04M 1/00
[52] U.S. Cl. ............................ 455/561; 455/570
[58] Field of Search ................. 455/81, 127, 116, 455/126, 33.1, 343, 464, 569, 570, 561, 550, 222; 379/59, 60, 62, 418

[56] References Cited

U.S. PATENT DOCUMENTS

| | | | |
|---|---|---|---|
| 5,327,461 | 7/1994 | Kushige | 375/27 |
| 5,349,701 | 9/1994 | Lobel | 455/222 |
| 5,381,460 | 1/1995 | Ohashi et al. | 379/58 |
| 5,384,807 | 1/1995 | Yatim et al. | 375/27 |

Primary Examiner—Edward F. Urban
Assistant Examiner—Darnell R. Armstrong
Attorney, Agent, or Firm—Daniel D. Hill

[57] ABSTRACT

A digital cordless telephone (10) includes a handset (12) and a base station (14). A voice activity detector (20) in the handset (12) determines whether speech or silence is being received by a microphone (13) in the handset (12). An active enable signal is transmitted to the base station (14) when silence is being transmitted. An adaptive comfort noise generator (30) in the base station (14) then provides a comfort noise to a destination telephone instead of the silence. The output level of the comfort noise is a function of an energy level of a linear data signal received by the base station (14) before the enable signal becomes active.

20 Claims, 2 Drawing Sheets

METHOD AND APPARATUS FOR REDUCING POWER CONSUMPTION IN A COMMUNICATIONS SYSTEM

FIELD OF THE INVENTION

This invention relates generally to communications systems, and more particularly, to a method and apparatus for reducing power consumption in a digital cordless telephone system.

BACKGROUND OF THE INVENTION

A digital cordless telephone handset receives an analog signal (e.g., voice) via a microphone, converts the analog signal into a digital signal, compresses the digital signal, and modulates the compressed signal at a radio frequency (RF). The modulated RF signal is transmitted to a nearby base station where it may be converted to an analog signal and transmitted via a telephone network to a destination telephone. Because the handset is battery powered, it is important to reduce power consumption to increase the operating time on the battery between charges.

One method to reduce power consumption is to reduce data processing in the handset during periods of silence, or pauses in a conversation. Voice activity detection (VOX) has been used to reduce power consumption in a cordless telephone handset by causing the handset to enter a low power mode. When silence is detected, a VOX signal is transmitted to the base station. Instead of transmitting silence frames, the base station then transmits a white noise (randomly generated comfort noise) to the destination telephone. The comfort noise is generated at a preprogrammed fixed output level which is located in a look-up table stored in a ROM (read-only-memory). However, once programmed, the output level cannot be changed to take into account different environmental background noise levels. Also, the ROM used to store the look-up table and other control parameters requires significant surface area on an integrated circuit used to implement the comfort noise generator, thus increased manufacturing costs.

DESCRIPTION OF A PREFERRED EMBODIMENT

Generally, the present invention provides a digital cordless telephone system having a handset and a base station. A voice activity detector in the handset determines whether speech or silence is being received by a microphone in the handset. An active enable signal is transmitted to the base station when silence is being transmitted. An adaptive comfort noise generator provides comfort noise to a destination telephone. The output level of comfort noise is a function of an energy level of a linear data signal received by the base station before the enable signal becomes active. The adaptive comfort noise generator eliminates the need for a ROM to store the look-up tables for the comfort noise output level. Also, the comfort noise output level can be changed to take into account different environmental background noise levels.

Figure 1:
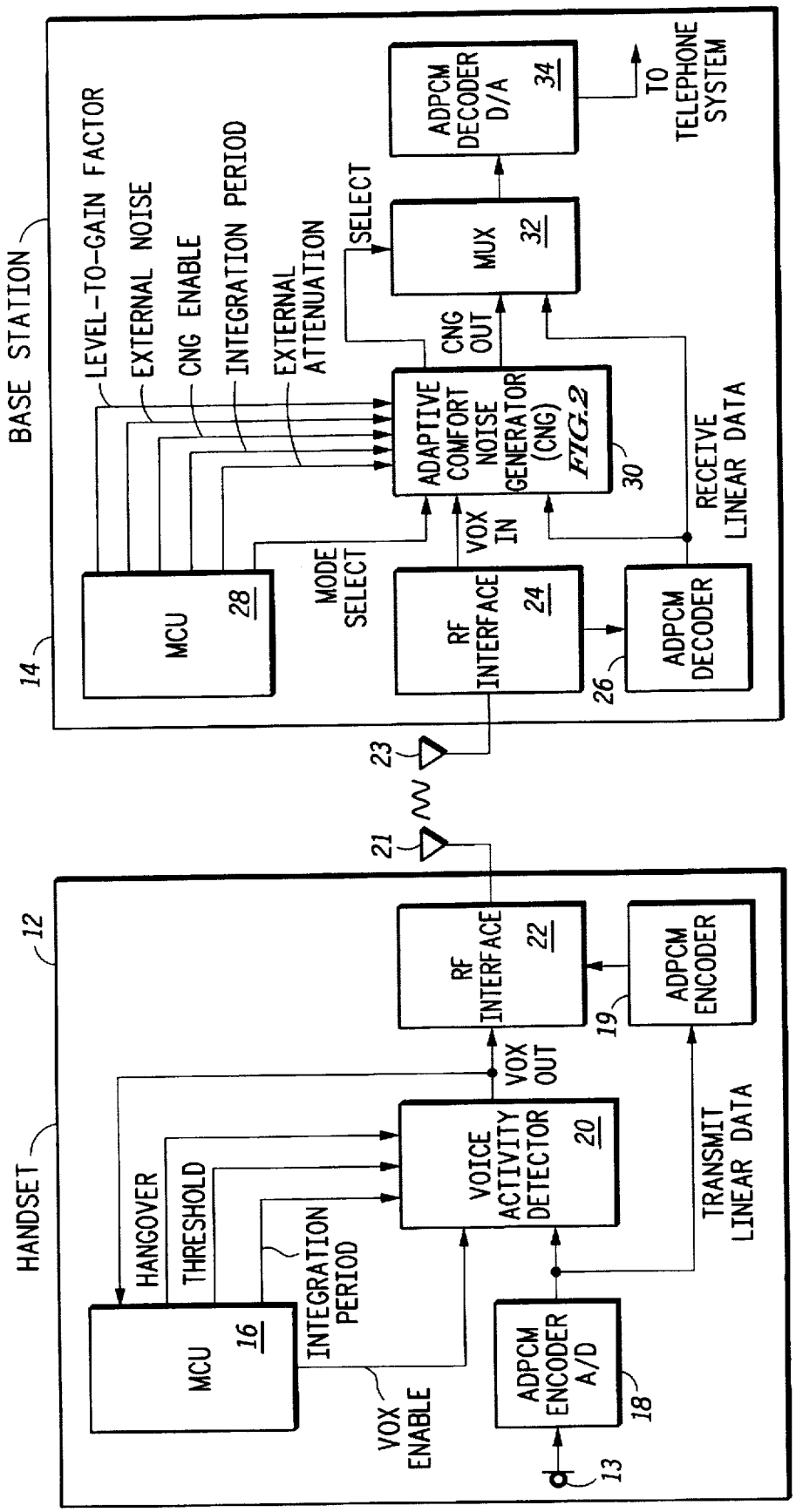
FIG. 1 illustrates in partial block and partial schematic form a cordless telephone system according to the present invention.

The present invention can be more fully described with reference to FIGS. 1 and 2. FIG. 1 illustrates in partial block and partial schematic form a cordless telephone system 10 according to the present invention. Cordless telephone system 10 generally includes a handset 12 and a base station 14 for communicating there between. Specifically illustrated in FIG. 1 is a transmit portion of handset 12 and a receive portion of base station 14 useful in understanding the present invention. Handset 12 and base station 14 communicate over a radio frequency (RF) communication link by an antenna 21 associated with handset 12 and an antenna 23 associated with base station 14. Handset 12 includes generally a microphone 13, a microcontroller unit (MCU) 16 and adaptive differential pulse code modulation (ADPCM) encoder-decoder (CODEC) and analog-to-digital converter (A/D) (18), a voice activity detector 20 and RF interface 22. As part of transmitting handset 12 receives a voice signal through microphone 13. ADPCM encoder A/D 18 has an input for receiving this signal from microphone 13 and an output. ADPCM encoder A/D 18 has an output for providing a signal labeled "TRANSMIT LINEAR DATA." MCU 16 is a controller for handset 12 and has an input for receiving a signal labeled "VOX OUT" and outputs for providing several control signals including signals labeled "VOX ENABLE", "INTEGRATION PERIOD", "THRESHOLD", and "HANGOVER". Voice activity detector 20 has inputs for receiving signals VOX ENABLE, INTEGRATION PERIOD, THRESHOLD, and HANGOVER from MCU 16 and an input for receiving TRANSMIT LINEAR DATA, and an output for providing signal VOX OUT.

Base station 14 includes a microphone 23, an RF interface 24, an ADPCM decoder 26, an MCU 28, adaptive comfort noise generator (CNG) 30, a multiplexer MUX 32 and an ADPCM decoder D/A 34. RF interface 24 has an input connected to antenna 23 and a first output for providing a signal labeled "VOX IN" and a second output. ADPCM decoder 26 has an input connected to the second output of RF interface 24 and a second output for providing a signal labeled "RECEIVE LINEAR DATA". MCU 28 has a control output for providing several signals associated with the operation of base station 14 including a signal labeled "MODE SELECT", a signal labeled "EXTERNAL ATTENUATION", a signal labeled "INTEGRATION PERIOD", a signal labeled "CNG ENABLE", a signal labeled "EXTERNAL NOISE", and a signal labeled "LEVEL-TO-GAIN FACTOR". Adaptive CNG 30 has a control input connected to the control output of MCU 28 for receiving the output signals conducted thereby, an input for receiving signal VOX IN, an input for receiving signal RECEIVE LINEAR DATA, and an output for providing a signal labeled "CNG OUT". MUX 32 has a first input for receiving signal CNG OUT, a second input for receiving signal RECEIVE LINEAR DATA, a control input for receiving CNG enable, and an output. ADPCM decoder D/A 34 has an input connected to the output of MUX 32 and an output signal which is provided to a telephone system (not shown).

In operation, handset 12 is used as part of a digital cordless telephone system that, for example, may implement CCITT G.726 ADPCM, and which may be used in a cordless telephone system such as the U.K. cordless telephone second generation (CT-2) standard. However, it should be apparent that digital cordless telephone system 10 may be any other type of cordless telephone in which signals are encoded digitally prior to transmission. ADPCM encoder A/D 18 receives an analog signal provided by microphone 13 and converts the analog signal into a digital signal, namely signal TRANSMIT LINEAR DATA. TRANSMIT LINEAR DATA is provided to an input ADPCM ENCODER 19. ADPCM ENCODER 19 receives TRANSMIT LINEAR DATA and performs adaptive differential encoding. This adaptive differential encoding is performed according to the G.726 standard. RF interface 22 takes the output of ADPCM ENCODER 19 and modulates it up to RF and transmits it via antenna 21 over the communications link according to the CT-2 standard.

In addition to these conventional functions associated with a cordless telephone, handset 12 also includes a voice activity detector 20. Voice activity detector 20 is for the purpose of conserving the power of handset 12, which will extend battery life. Voice activity detector 20 detects periods of time during which no voice signal is being received by ADPCM ENCODER A/D 18, and in response to detecting a period of no voice activity of sufficient length provides signal VOX OUT to both RF interface 22 and MCU 16. In response to receiving signal VOX OUT, MCU 16 may take any appropriate action to conserve power, such as disabling components of handset 12, going into sleep or stop mode, or the like.

MCU 16 also provides several control signals associated with the operation of voice activity detector 20. Signal VOX ENABLE is a signal which determines whether voice activity detector 20 is active to provide signal VOX OUT. The INTEGRATION PERIOD represents the period of time over which voice activity detector 20 will detect the presence of voice. Generally, voice activity detector 20 computes an average energy in the TRANSMIT LINEAR DATA signal over a period of time defined by the INTEGRATION PERIOD. If the energy level exceeds a level defined by signal THRESHOLD, then voice activity detector 20 has detected a period with speech. Signal HANGOVER defines a number of integration periods during which voice activity detector 20 will not activate signal VOX OUT despite the presence of silence, which helps to prevent voice activity detector 20 from providing signal VOX OUT during periods of low energy such as toward the end of a spoken word or sentence. Signal HANGOVER may be any arbitrary integer value, such as three integration periods.

In an actual implementation, ADPCM encoder A/D 18, ADPCM encoder 19, and voice activity detector 20 are implemented as part of a single integrated circuit which is known generally as an ADPCM CODEC. This integrated circuit is implemented as a special purpose, microcoded digital signal processor (DSP), but may be implemented using other techniques such as random logic. In addition, MCU 16 communicates with the ADPCM CODEC through a special interface such as a serial peripheral interface (SPI). For such a system, MCU 16 will provide signals VOX ENABLE, HANGOVER, THRESHOLD, and the INTEGRATION PERIOD to voice activity detector 20 by sending serial streams of data to program registers associated with the ADPCM CODEC. Such operation is conventional and may vary from embodiment to embodiment.

According to the present invention, base station 14 includes a mechanism to avoid two problems associated with the voice activity detection occurring in handset 12. Using adaptive CNG 30, base station 14 is able to eliminate the irritating clicking caused by voice activity detector 20, associated with the transition from periods of speech to silence. In addition, adaptive comfort noise generator 30 is able to provide background noise which varies according to the energy in the received signal. Thus, adaptive CNG 30 provides noise which is more aesthetically pleasing to the listener and is adapted automatically according to the background noise.

In general, base station 14 accomplishes these advantages by receiving the data signal along with a voice activity detect signal labeled "VOX IN." Next, base station 14 determines whether an energy level estimate of the data is above the predetermined threshold level. In other words, whether signal VOX IN is inactive. If so, then an energy level estimate is summed and multiplied by the LEVEL-TO-GAIN FACTOR to arrive at an automatically generated attenuation value. Nonetheless, since this is a period of voice, the received linear data is still transmitted. However, if it is determined that the energy level estimate of the signal is below a predetermined threshold by signal VOX IN being active, then the automatically generated attenuation value is multiplied by an internally generated noise signal to generate comfort noise output signal CNG OUT, and CNG OUT is transmitted as a function of, or based on, the RECEIVE LINEAR DATA.

Now turning particularly to base station 14, a signal is received at antenna 23 and is demodulated to baseband by RF interface 24. ADPCM decoder 26 receives the base band signal and provides the RECEIVE LINEAR DATA. RF interface 24 receives signal VOX IN which is provided to a control input of adaptive CNG 30. Adaptive CNG 30 has an input which is controlled by MCU 28. In the illustrated cordless telephone system, MCU 28 communicates with adaptive comfort noise generator 30 via an SPI (serial-peripheral interface) port in a manner similar to the communication between MCU 16 and voice activity 20 in handset 12.

Specifically, MCU 28 provides several control signals to adaptive CNG 30 which provide flexibility. First the MODE SELECT signal chooses how the noise is to be generated. MODE SELECT is used in conjunction with signal CNG ENABLE, which in part, determines how CNG OUT is to be generated. Together, MODE SELECT and CNG ENABLE define three modes of operation which, in the illustrated embodiment, are two control bits in a control register (not shown). The three modes of operation available are the automatic mode, which provides internal attenuation and internal noise; the mixed mode, which provides external attenuation and automatically generated noise; and the external mode, which provides an externally attenuated noise signal. In addition, signal CNG ENABLE determines whether the output of adaptive CNG 30 will ever be provided as an output of base station 14. Thus, when CNG ENABLE is inactive, MUX 32 always selects RECEIVE LINEAR DATA to provide to the output thereof. If CNG ENABLE is active, then adaptive CNG 30 provides comfort noise signal CNG OUT if VOX IN is active, or provides RECEIVE LINEAR DATA to the output thereof if VOX IN is inactive. Signal EXTERNAL ATTENUATION is used in mixed mode to define the attenuation level and the EXTERNAL ATTENUATION is used in mixed mode to attenuate the internally generated noise signal. Finally, signal EXTERNAL NOISE is used in external mode to be CNG OUT during periods of silence.

Adaptive CNG 30, RF interface 24, ADPCM decoder 26, multiplexer 32, and ADPCM decoder D/A 34 may also be included in handset 12 providing full-duplex operation to communication system 10, and would operate in the same manner as described above for base station 14, except that ADPCM decoder D/A 34 would be connected to a speaker instead of to the telephone system. When silence is detected, from the telephone system via base station 14, the ADPCM algorithm could be shut down in handset 12 to conserve handset battery power.

Figure 2:
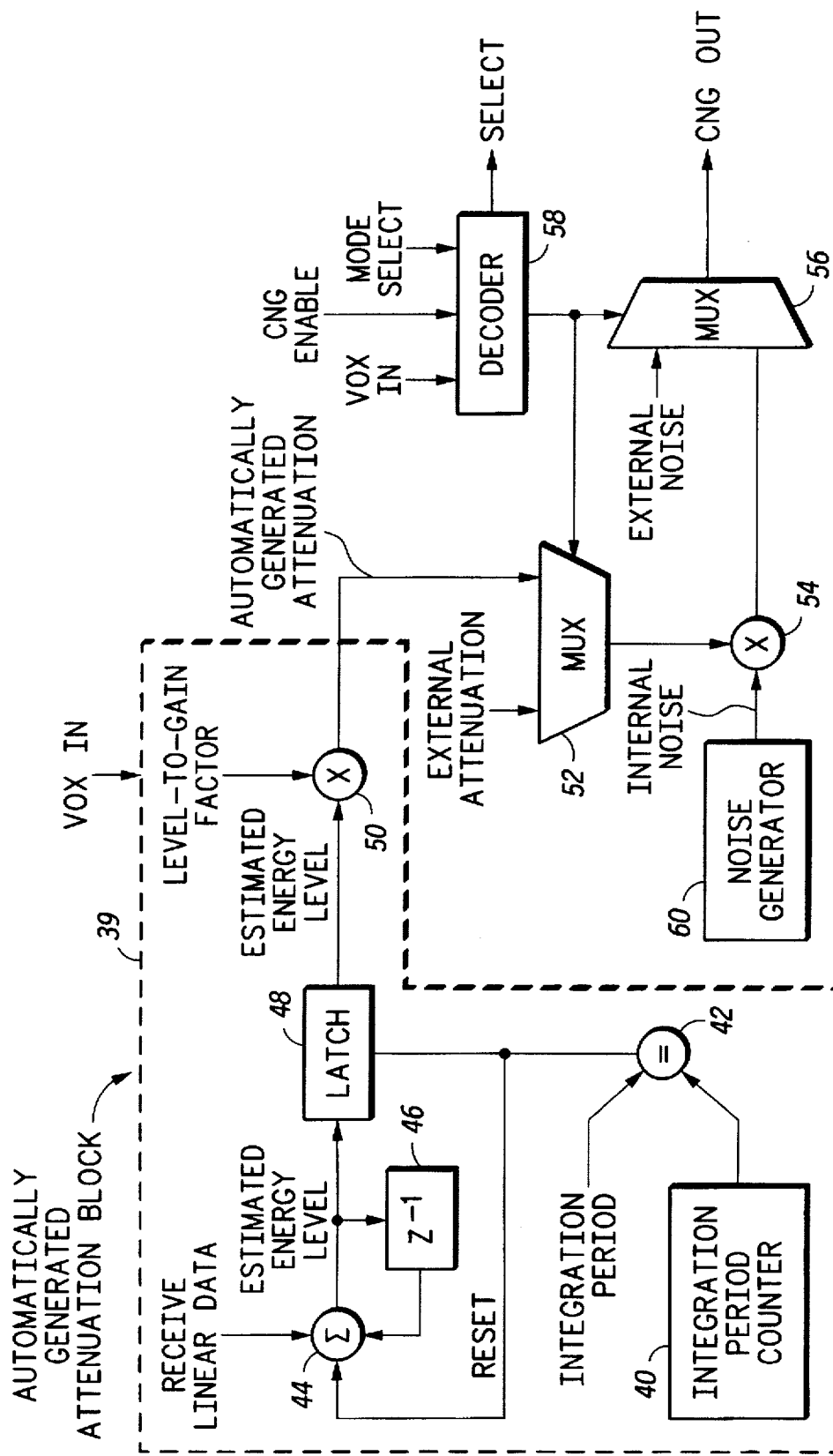
FIG. 2 illustrates in partial block diagram form and partial logic diagram form, an adaptive comfort noise generation of the cordless telephone system of FIG. 1.

FIG. 2 illustrates in partial block diagram form and partial logic diagram form adaptive CNG 30 of FIG. 1. Adaptive CNG 30 includes generally an automatically generated attenuation block 39, a MUX 52, a multiplier 54, a MUX 56, a decoder 58, and a noise generator 60. Automatically generated attenuation block 39 includes an integration period counter 40, a comparator 42, summing device 44, a delay element, 46, a latch 48, and a multiplier 50. Integration period counter 40 may be a conventional upcounter. Comparator 42 has a first input for receiving the INTEGRATION PERIOD, a second input connected to the output of integration period counter 40 and output for providing a signal labeled "RESET". Summing device 44 has a first input for receiving signal RECEIVE LINEAR DATA, a second input, a clear input for receiving signal RESET, and an output. Delay element 46 has an input connected to the output of summing device 44 and an output connected to the second input of summing device 44. Latch 48 has an input connected to the output of summing device 44 and a control input for receiving signal RESET and an output for providing a signal labeled "ESTIMATED ENERGY LEVEL". Multiplier 50 has a first input for receiving the LEVEL-TO-GAIN FACTOR, the second input for receiving the ESTIMATED ENERGY LEVEL, and an output for providing a signal labeled "AUTOMATICALLY GENERATED ATTENUATION". MUX 52 has a first input for receiving signal EXTERNAL ATTENUATION, a second input for receiving signal AUTOMATICALLY GENERATED ATTENUATION, a control input connected to the output of decoder 58, and an output for providing a signal labeled "INTERNAL NOISE". Noise generator 60 may be any conventional noise generator which generates white noise at the output thereof. In the illustrated embodiment, a linear feedback shift register and a calibration factor is used to generate INTERNAL NOISE. Multiplier 54 has a first input connected to the output of MUX 52, a second input connected to the output of noise generator 60, and an output. MUX 56 has a first input for receiving signal EXTERNAL NOISE, a second input connected to the output of multiplier 54, a control input connected to the output, the first output of decoder 58, and an output for providing signal CNG OUT. Decoder 58 has a first input terminal for receiving VOX IN, a second input terminal for receiving signal CNG ENABLE, a third input terminal for receiving signal MODE SELECT, a first output terminal connected to the control input terminals of MUXes 52 and 56, and an output terminal for providing signal SELECT.

In operation, adaptive CNG 30 includes signal processing blocks to implement the three available modes referred to above. In actuality, the functions of adaptive CNG 30 are performed by microcode running on a dedicated DSP and thus the functions of the various blocks may not correspond directly to hardware circuitry. However, it should be apparent that the functions of adaptive CNG 30 may be performed either by hardware circuitry, by microcode, by software running on a general purpose data processor, or by some combination thereof.

When automatically generated attenuation block 39 is used in automatic mode, comparator 42 determines the period during which the estimated energy level is averaged, and at the end of the period, resets summing device 44. In addition, the output comparator 42 latches ESTIMATED ENERGY LEVEL in latch 48. The LEVEL-TO-GAIN FACTOR is multiplied by ESTIMATED ENERGY LEVEL using multiplier 50. Because the LEVEL-TO-GAIN FACTOR is received as an input and is not accessed through a ROM table look up, adaptive CNG 30 is area efficient. In addition, adaptive CNG 30 is more flexible than known comfort noise generation systems because the various mode selection signals are received from MCU 28 need not be stored in ROM. The AUTOMATICALLY GENERATED ATTENUATION value is provided to the second input of MUX 52. In automatic mode, decoder 58 provides the first out put signal to select the second input of MUX 52. Thus, AUTOMATICALLY GENERATED ATTENUATION value is multiplied by the INTERNAL NOISE in multiplier 54. Furthermore, decoder 58 selects the second input of MUX 56 as CNG OUT.

Alternately, in mixed mode, decoder 58 selects the first input of MUX 52, thus MUX 52 selects EXTERNAL ATTENUATION to be provided at the output terminal thereof. EXTERNAL ATTENUATION is multiplied by the INTERNAL NOISE and furthermore, decoder 58 selects the second output of MUX 56 to provide CNG OUT.

In external mode, however, decoder 58 selects the first input of MUX 56, thus the externally generated noise signal EXTERNAL NOISE is provided as CNG OUT. Because of these three selectable modes, adaptive CNG 30 is substantially more flexible than known comfort noise generation systems.

While the invention has been described in the context of a preferred embodiment, it will be apparent to those skilled in the art that the present invention may be modified in numerous ways and may assume many embodiments other than that specifically set out and described above. Accordingly, it is intended by the appended claims to cover all modifications of the invention which fall within the true spirit and scope of the invention.

What is claimed is:

1. A communications receiver, comprising:

an automatically generated attenuator having an input for receiving a linear data signal, a control input for receiving a level-to-gain factor, an enable input for receiving a voice activity signal, and an output for providing an automatic attenuation signal, said automatically generated attenuator calculating an estimated energy level of said linear data signal and multiplying said estimated energy level by said level-to-gain factor and providing said automatic attenuation signal as a product thereof when enabled by said voice activity signal;

a noise generator having an output for providing a noise signal; and a multiplier having a first input coupled to said output of said automatically generated attenuator, a second input coupled to said output of said noise generator, and an output for providing an adaptive comfort noise generation signal.

2. The communications apparatus of claim 1 wherein said automatically generated attenuator has a control input for receiving an integration period.

3. The communications apparatus of claim 1 wherein said automatically generated attenuator comprises:

an integration period counter having an output for providing a count signal;

a comparator having a first input for receiving said integration period, a second input coupled to said output of said integration period counter, and an output for providing a reset signal;

a summing device having a first input for receiving said linear data signal, a second input, a clear input for receiving said reset signal, and an output for providing said estimated energy level;

a delay element having an input for receiving said estimated energy level, and an output coupled to said second input of said summing device; and a second multiplier having a first input for receiving a level-to-gain factor, a second input coupled to said output of said summing device, and an output for providing said automatic attenuation signal.

4. The communications apparatus of claim 1 further comprising a multiplexer having a first input for receiving said automatic attenuation signal, a second input for receiving an external attenuation signal, a control input for receiving a decoded mode signal, and an output coupled to said second input of said multiplier.

5. The communications apparatus of claim 1 further comprising a multiplexer having a first input for receiving said adaptive comfort noise generation signal, a second input for receiving an external noise signal, a control input for receiving a decoded mode signal, and an output for providing a comfort noise generation output signal.

6. The communications apparatus of claim 1 wherein further comprising:

a radio frequency interface having an input for receiving a radio frequency signal, and a first output for providing said voice activity signal, and a second output for providing a baseband signal;

a decoder having an input coupled to said second output of said radio frequency interface, and an output for providing said linear data signal; and a multiplexer having a first input for receiving said adaptive comfort noise generation signal, a second input for receiving said linear data signal, a control input for receiving a comfort noise generation enable signal, and an output for providing an output digital signal.

7. The communications apparatus of claim 6 wherein said decoder is characterized as being an adaptive pulse code modulation (ADPCM) decoder.

8. A communications receiver, for use with a radio frequency interface having an input for receiving a radio frequency signal, a first output for providing a voice activity signal, and a second output for providing a baseband signal, comprising:

a decoder having an input coupled to said second output of said radio frequency interface, and an output for providing a linear data signal; and an adaptive comfort noise generator having a first input for receiving said voice activity signal, a second input for receiving said linear data signal, a first control input for receiving an enable signal, a second control input for receiving a level-to-gain factor, and an output for providing a comfort noise generation signal, wherein said adaptive comfort noise generator automatically attenuates said linear data signal by multiplying an estimated average energy in said linear data signal with said level-to-gain factor.

9. The communications apparatus of claim 8 further comprising a multiplexer having a first input for receiving said comfort noise generation signal, a second input for receiving said linear data signal, a control input for receiving a comfort noise generation enable signal, and an output for providing an output digital signal.

10. The communications apparatus of claim 9 wherein said adaptive comfort noise generator comprises:

an automatically generated attenuator having an input for receiving the linear data signal, an enable input for receiving a voice activity signal, and an output for providing an automatic attenuation signal, said automatically generated attenuator calculating an estimated energy level of said linear data signal and providing said automatic attenuation signal in response thereto when enabled by said voice activity signal;

a noise generator having an output for providing a noise signal; and a multiplier having a first input coupled to said output of said automatically generated attenuator, a second input coupled to said output of said noise generator, and an output for providing an adaptive comfort noise generation signal.

11. The communications apparatus of claim 10 wherein said automatically generated attenuator comprises:

an integration period counter having an output for providing a count signal;

a comparator having a first input for receiving an integration period, a second input coupled to said output of said integration period counter, and an output for providing a reset signal;

a summing device having a first input for receiving said linear data signal, a second input, a clear input for receiving said reset signal, and an output for providing said estimated energy level;

a delay element having an input for receiving said estimated energy level, and an output coupled to said second input of said summing device; and a second multiplier having a first input for receiving said level-to-gain factor, a second input coupled to said output of said summing device, and an output for providing said automatic attenuation signal.

12. The communications apparatus of claim 10 further comprising a multiplexer having a first input for receiving said automatic attenuation signal, a second input for receiving an external attenuation signal, a control input for receiving a decoded mode signal, and an output coupled to said second input of said multiplier.

13. The communications apparatus of claim 10 further comprising a multiplexer having a first input for receiving said adaptive comfort noise generation signal, a second input for receiving an external noise signal, a control input for receiving a decoded mode signal, and an output for providing a comfort noise generation output signal.

14. The communications apparatus of claim 10 further comprising a full-duplex handset having a second adaptive comfort noise generator for reducing power consumption in the full-duplex handset.

15. A method for reducing power consumption in a communications apparatus, comprising the steps of:

receiving data and a voice activity detect signal;

determining that an energy level estimate of the data is above a predetermined threshold level;

multiplying a summed energy level estimate by a level-to-gain factor to generate an automatically generated attenuation value;

transmitting an output data signal based on the data;

determining that the energy level estimate of the data is below the predetermined threshold level;

multiplying the automatically generated attenuation value by an internally generated noise signal to generate a comfort noise output signal; and transmitting an output noise signal based on the comfort noise output signal.

16. The method of claim 15, wherein the step of determining the summed energy level estimate comprises the steps of:

counting a predetermined number of samples in a frame of data to provide a predetermined integration period; and summing the energy level estimate over the predetermined integration period to generate the summed energy level estimate.

17. The method of claim 15, further comprising the steps of:
receiving a mode select signal;
when the mode select signal is in a first logic state, providing the comfort noise output signal; and
when the mode select signal is in a second logic state, providing an externally generated noise signal.

18. The method of claim 15, wherein the step of multiplying the automatically generated attenuation value comprises the step of multiplying an externally generated attenuation value by the internally generated noise signal to generate the comfort noise output signal.

19. The method of claim 15, wherein the step of multiplying the energy level estimate by a level-to-gain factor further comprises experimentally determining the level-to-gain factor by scaling an inverse value of the summed energy level estimate for a maximum energy level sine wave.

20. The method of claim 15, further comprising the step of providing an internally generated noise signal and wherein the step of multiplying the automatically generated attenuation value comprises the step of multiplying an externally generated attenuation value by the internally generated noise signal to generate the comfort noise output signal.

* * * * *